Patented June 26, 1951

2,558,453

UNITED STATES PATENT OFFICE 2,558,453

FROZEN CONFECTION AND METHOD OF MAKING SAME

Clyde H. Minster, Beckley, W. Va.

No Drawing. Application February 17, 1949,
Serial No. 77,051

12 Claims. (Cl. 99—136)

This invention relates to frozen confections and particularly to confections of the type which are adapted to be coated with chocolate or other flavored edible coating compositions.

It is an object of this invention to provide a novel frozen confection having a smooth porous consistency unlike that of ordinary ice creams, ices, or sherbets, but resembling, while in the frozen state, the consistency of marshmallows at room temperature. It is a further object to provide such a frozen confection which has a smooth texture and is free from any ice crystals of substantial size. A still further object is to provide a frozen confection which softens, but does not revert to the fluid state when it is warmed to room temperature, so that there is no tendency for the confection to drip while being consumed or while the coating is being applied.

These objects are accomplished by preparing an aerated mixture of non-fat milk solids, cane sugar, corn sugar, gelatin, water, and flavoring under such conditions that the mixture contains between 55% and 65% by volume air uniformly dispersed throughout it, and thereafter freezing the mixture under quiescent conditions. In a preferred embodiment, a mixture of non-fat milk solids, cane sugar, corn sugar, gelatin, water, and flavoring containing between 0.75% and 2.5% by weight gelatin is whipped mechanically until the volume has been increased to two and a half times the original volume, i. e., until the mixture contains 60% by volume air, after which the aerated mixture is frozen while in a quiescent state.

A composition which is particularly useful in the practice of this invention has the following composition by weight:

| | Per cent |
|---|---|
| Granulated cane sugar | 12 |
| Corn sugar | 8 |
| Non-fat milk solids | 14 |
| Gelatin | 1 |
| Water | 65 |
| Flavoring | to taste |

To make one hundred gallons (prior to aeration) of this basic mix, the following amounts should be employed:

| | Pounds |
|---|---|
| Cane sugar | 110.4 |
| Corn sugar | 73.6 |
| Non-fat milk solids | 128.8 |
| Gelatin | 9.2 |
| Total dry ingredients | 322.0 |
| Water | 71.7 gal.=598 |
| | 920 |

In the preparation of a batch of this mix, the required amount of water at ordinary temperature, usually between 60° and 85° F., is placed in a pasteurizer or other receptacle equipped with means for agitating and for heating its contents. With the agitator running, the gelatin mixed with about ten times its weight of cane sugar is added slowly to the water. The purpose of mixing the gelatin with the sugar before adding to the water is to avoid formation of lumps of gelatin, in which a gelatinized surface prevents water from reaching and softening the dry gelatin on the inside of the lump. When thoroughly mixed with the highly soluble cane sugar, the gelatin disperses much more smoothly and readily in the water. When the gelatin addition is complete, the remaining sugar and the non-fat milk solids are added, and the mixture is agitated for five minutes to secure complete mixing. At the end of this time, the composition is heated to 170° F. and held at this temperature for ten minutes. It is then cooled to between 35° and 50° F., and is preferably drawn off into milk cans or other suitable portable containers. The filled containers are kept in a refrigerated room at between 35° and 50° F. until the mix is to be used, which should not be for at least twelve hours. During this aging period, the mix becomes very viscous. It is for this reason that storage in portable containers from which the composition may be poured into the turbulent mixing equipment is desirable, since the viscosity of the mix makes flow through pipe lines difficult, except when a positive type pump is used.

Flavoring, such as vanilla, may be added with the other ingredients, but is preferably introduced at some time after the heating step, to avoid loss of the volatile ingredients. The most convenient time for adding flavoring is when the mix is transferred to the turbulent mixing equipment. When flavoring with vanilla, it is desirable to use approximately three times the quantity of vanilla required to flavor the same quantity of ice cream mix. The exact amount to be added will depend on the strength of the extract employed, and the intensity of flavor desired. Other flavors may, of course, be used instead of or in addition to vanilla.

For the whipping step, the mix is transferred to a mechanical mixer of any type which will agitate the product with enough turbulence to incorporate therein air in the form of fine bubbles. The amount of mix introduced into the mixer should not exceed about 40% of the cubic capacity of the mixer, since the finished product should contain about 60% by volume air. Turbulent mixing or whipping is then initiated, and is continued until the desired amount of air has become incorporated. No refrigeration is employed during this whipping step. As before stated, the final aerated product contains between 55% and 65% by volume air, and preferably 60%. This corresponds to increasing the volume of the mix between 2.22 and 2.86, and preferably 2.5 times its original volume. With the composition described, it is not difficult to secure over-runs sufficient to reach these limits.

The whipped mix is next drawn off into molds or other containers in which it is to be frozen, or into intermediate storage containers. If the product is to be used as a center in a frozen coated confection, the whipped mix is placed in standard molds and frozen in conventional manner, either in the form of bars or on sticks. The frozen shaped confections are then dipped into a bath of fluid coating composition, removed quickly, and the excess coating allowed to drain off. An advantage of the composition here disclosed, as compared with ice creams or ices, is that the present product does not revert to the fluid state when introduced into the warm coating bath, and therefore does not drip. The danger of adding undesired water to the coating is correspondingly minimized.

The product obtained according to the process set forth herein is a novel confection having a number of desirable characteristics as compared with previously known compositions. When frozen, the product has a smooth, soft, porous consistency, closely resembling that of marshmallows at room temperature and quite unlike that of ice cream, sherbet or ices. This smooth, yielding consistency results in a particularly palatable confection. When chocolate is used as a coating, the effect is very similar to that of chocolate-covered marshmallows, except for the low temperature of the presently described product. Other flavored edible coatings may be used instead of chocolate.

This product has the further characteristic that when warmed, the composition softens but does not become fluid or drip. This feature is of particular advantage as compared to ice creams or ices when the product is frozen on a stick and is held in the hand while being eaten. Even when eaten by small children, the confection can usually be handled so as to avoid the mess ordinarily incident to the consumption of similar frozen products. This property is also of value in case the confection is to be coated, since it prevents dripping into the coating bath and also results in better adhesion of the coating to the frozen center. Poor adhesion of the coating and deformation of the coated articles are obtained when substantial melting of the center occurs during coating.

The unique properties of this frozen confection result both from its composition and from the process by which it is produced. The mixture of ingredients listed above, largely by virtue of its gelatin content, has the ability to retain large amounts of air in the form of a relatively stable foam. Conversely, the presence of air bubbles in the amounts used in this product has several beneficial results. One such result is to produce a confection which has a soft consistency even when frozen; another is to reduce the volume cost of the confection very considerably. Furthermore, as a result of the presence of the bubbles, the liquid suspension of gelatin, sugar, non-fat milk solids and water exists in the form of thin films surrounding the bubbles rather than in the form of sizable droplets or larger discrete liquid masses. This helps to avoid melting when the confection is warmed, since surface tension prevents free flow of the highly extended liquid films. Melting is also inhibited by the composition of the liquid itself, with its tendency to form a gel structure.

Another highly desirable result of having the liquid suspension present in the form of thin films is that it becomes impossible to form any undesirably large ice crystals when the composition is frozen. This automatically assures that the product will be smooth and soft in texture, and that it will be free not only from coarse granular crystals, but also from the hard over-all structure which is characteristic of most quiescently frozen materials containing substantial amounts of water. To such an extent are sizable ice crystals avoided that it becomes possible to freeze the mixture under quiescent conditions. With previously known confections in which a considerable quantity of air is incorporated, it has been the practice (in most cases the necessary practice) to introduce air during instead of prior to the freezing process. The proper incorporation of air in such prior art processes is dependent upon physical changes brought about in the mix by the freezing out of a portion of the water in the mix. It is therefore necessary in such processes to maintain the mix in a turbulent state during at least a part of the freezing process in order to control the size of the ice particles which are formed, as well as to introduce the desired amounts of air. The relative smoothness of a product that is frozen is determined by the size of the ice crystals. In prior art processes the size of the ice crystals is controlled by rapidly freezing at the walls of a refrigerated cylinder, and rapidly scraping the frozen portion from the walls, while maintaining the mix in a turbulent state. Freezing of prior art compositions under quiescent conditions has not been successful in producing a smooth product.

When individually molded blocks or bars of frozen confection are to be produced, the aerated mixture produced according to the present invention is fed directly to the molds and there frozen quiescently. With prior art compositions, it is necessary first to freeze the mixture partially under turbulent conditions, then to transfer it to molds, and finally to complete freezing it in the molds. This involves not only an extra freezing operation but also the risk that during the transfer from the equipment used for the initial turbulent freezing step to the molds, some of the mixture will melt and will thereafter produce undesirably large ice crystals when it is refrozen under quiescent conditions in the molds. With the product of this invention, only one freezing step is involved and particle size of the ice crystals is automatically controlled to yield a smooth product.

Although I have described this invention in terms of a specific preferred composition and with reference to one useful method of preparation, it will be understood by those skilled in the art that many minor variations both in the composition and in the process may be made without departure from the spirit of the invention. Thus the particular proportions of the preferred composition which I have shown may be varied somewhat without material effect on the resulting product. It is essential, however, that the gelatin content be at least 0.75% by weight and, also, that the specified amount of air be incorporated during the whipping step. Each of these ingredients plays an especially significant role in producing the unique physical properties of this frozen confection. The use of over 2.5% gelatin produces less desirable compositions than lower amounts, since with increasing amounts, the product becomes progressively more rubbery. The amount of gelatin used will depend somewhat on its gel-strength. Thus, while best results are obtained with 1% gelatin of average gel-strength, correspondingly larger amounts will be required if a lower gel-strength gelatin is employed.

Beet sugar is completely interchangeable with cane sugar and may be regarded as its full equivalent in this composition. Although the preferred mixture described above shows the use of dried corn sugar, it is possible to substitute corn syrup for part or all of this, due allowance being made for the water thereby introduced. A suitable form of corn sugar is that marketed under the name "Frodex", though other dried corn sugars may be used. It is to be noted that the product herein disclosed does not purport to be an ice cream so as to fall within the purview of the various regulatory laws as to the permissible composition of ice cream. On the contrary, the present product is a frozen confection having unique physical properties which are quite distinct from those of ice cream.

Although I have described the incorporation of air into the composition by means of mechanical whipping machines, it is possible to employ compressed air instead, provided there is adequate regulation of the bubble size. Many other similar minor changes in the composition or the process of manufacture will be understood to fall within the scope of this invention, which I intend to limit only in accordance with the scope of the claims hereunto appended.

I claim:

1. A frozen confection comprising non-fat milk solids, cane sugar, corn sugar, gelatin, water and flavoring, characterized by a smooth porous consistency resembling, while frozen, that of marshmallows at room temperature, and having the ability to soften without reverting to the fluid state when warmed to room temperature.

2. A frozen confection comprising an aerated mixture of non-fat milk solids, cane sugar, corn sugar, gelatin, water and flavoring, said confection containing between 55% and 65% by volume air uniformly dispersed throughout the mixture.

3. In a frozen confection having a flavored, edible coating, a center comprising an aerated mixture of non-fat milk solids, cane sugar, corn sugar, gelatin, water and flavoring, said mixture having, while frozen, a smooth porous consistency resembling that of marshmallows at room temperature.

4. A frozen confection comprising an aerated mixture of non-fat milk solids, cane sugar, corn sugar, gelatin, water and flavoring, said mixture containing between 0.75% and 2.5% by weight gelatin and between 55% and 65% by volume air uniformly dispersed throughout the mixture.

5. In a frozen confection having a flavored, edible coating, a center comprising 20% by weight sugar, 14% by weight non-fat milk solids, 1% by weight gelatin and 60% by volume air uniformly dispersed throughout the composition.

6. A frozen confection having the following composition by weight:

| | Per cent |
|---|---|
| Granulated cane sugar | 12 |
| Corn sugar | 8 |
| Non-fat milk solids | 14 |
| Gelatin | 1 |
| Water | 65 |
| Flavoring | to taste |

7. A frozen confection having the following composition by weight:

| | Per cent |
|---|---|
| Granulated cane sugar | 12 |
| Corn sugar | 8 |
| Non-fat milk solids | 14 |
| Gelatin | 1 |
| Water | 65 |
| Flavoring | to taste | and containing 60% by volume air uniformly dispersed throughout the mixture.

8. The process of preparing a frozen confection which comprises forming an intimate mixture of water, gelatin, non-fat milk solids, cane sugar, corn sugar and flavoring; incorporating air therein until the volume has increased to from 2.22 to 2.86 times the original volume; and thereafter freezing the aerated mixture while in a quiescent state.

9. The process of preparing a frozen confection having a flavored, edible coating which comprises forming an intimate mixture of water, gelatin, non-fat milk solids, cane sugar, corn sugar and flavoring; incorporating air therein until the volume has increased to from 2.22 to 2.86 times the original volume; freezing the aerated mixture while in a quiescent state in molds having the desired shape; and thereafter applying a flavored, edible coating to the surface of the shaped frozen confection.

10. The process of preparing a frozen confection which comprises forming an intimate mixture of 65 parts by weight water, 1 part by weight gelatin, 20 parts by weight sugar, and 14 parts by weight non-fat milk solids; whipping the mixture mechanically until sufficient air has been incorporated therein to increase the volume to two and a half times the volume prior to whipping; and thereafter freezing the mixture while in a quiescent state.

11. The process of preparing a frozen confection which comprises mixing together 65 parts by weight water, 1 part by weight gelatin, 12 parts by weight cane sugar, 8 parts by weight corn sugar and 14 parts by weight non-fat milk solids; heating the mixture to 170° F. for ten minutes; cooling to between 35° and 50° F.; aging at this temperature for at least twelve hours; adding flavoring ingredients at some time after the cooling step but before whipping; whipping the mixture mechanically until sufficient air has been incorporated therein to increase the volume to two and a half times the volume prior to whipping; and thereafter freezing the mixture while in a quiescent state in molds having the desired shape.

12. The process of preparing a chocolate-coated frozen confection which comprises mixing together 65 parts by weight water, 1 part by weight gelatin, 12 parts by weight cane sugar, 8 parts by weight corn sugar and 14 parts by weight non-fat milk solids; heating the mixture to 170° F. for ten minutes; cooling to between 35° and 50° F.; aging to this temperature for at least twelve hours; adding flavoring ingredients at some time after the cooling step but before whipping; whipping the mixture mechanically until sufficient air has been incorporated therein to increase the volume to two and a half times the volume prior to whipping; freezing the mixture while in a quiescent state in molds having the desired shape; and thereafter applying a chocolate coating to the surface of the shaped, frozen confection.

CLYDE H. MINSTER.

REFERENCES CITED

The following references are of record in the file of this patent:

UNITED STATES PATENTS

| Number | Name | Date |
|---|---|---|
| 1,718,997 | Burt | July 2, 1929 |
| 2,060,679 | Lepper | Nov. 10, 1936 |

OTHER REFERENCES

"Manufacture of Sherbets and Ices" by S. L. Tuckey, The Ice Cream Review, October, 1937, pages 69, 70, 72 and 74.

"Manufacture of Sherbets and Ices" by W. H. Martin, The Ice Cream Trade Journal, September, 1938, page 12.

"Manufacturing Session Draws," The Ice Cream Trade Journal, November, 1926, pages 53–55.